(12) United States Patent
Park et al.

(10) Patent No.: US 10,455,068 B2
(45) Date of Patent: Oct. 22, 2019

(54) ELECTRONIC DEVICE AND METHOD FOR CONTROLLING DISPLAY USING PIEZOELECTRIC ELEMENT

(71) Applicant: Samsung Electronics Co., Ltd., Gyeonggi-do (KR)

(72) Inventors: Je Heon Park, Hwaseong-si (KR); Yong Jun Son, Hwaseong-si (KR); Soo Pyoung Park, Seoul (KR); Ji Hyun Park, Seongnam-si (KR); Ju Yeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/679,066

(22) Filed: Aug. 16, 2017

(65) Prior Publication Data

US 2018/0054503 A1 Feb. 22, 2018

(30) Foreign Application Priority Data

Aug. 16, 2016 (KR) ........................ 10-2016-0103419

(51) Int. Cl.
*H04M 1/02* (2006.01)
*H04M 1/03* (2006.01)
*H04R 7/10* (2006.01)
*H04M 1/22* (2006.01)
*H04R 17/00* (2006.01)

(52) U.S. Cl.
CPC ........... *H04M 1/22* (2013.01); *H04M 1/0266* (2013.01); *H04M 1/03* (2013.01); *H04R 7/10* (2013.01); *H04M 2201/38* (2013.01); *H04R 17/00* (2013.01); *H04R 2499/11* (2013.01); *H04R 2499/15* (2013.01)

(58) Field of Classification Search
CPC combination set(s) only.
See application file for complete search history.

(56) References Cited

U.S. PATENT DOCUMENTS

| 2008/0211779 | A1* | 9/2008 | Pryor ................. | G01C 21/3664 |
| | | | | 345/173 |
| 2010/0231558 | A1* | 9/2010 | Kwak .................. | G06F 1/1626 |
| | | | | 345/179 |
| 2011/0175813 | A1  | 7/2011 | Sarwar et al. | |
| 2014/0355792 | A1* | 12/2014 | Nabata .................. | H04M 1/035 |
| | | | | 381/162 |
| 2015/0119109 | A1* | 4/2015 | Sudo ...................... | H04R 7/045 |
| | | | | 455/566 |

(Continued)

FOREIGN PATENT DOCUMENTS

JP 2005045655 A 2/2005
KR 20110133766 A 12/2011

*Primary Examiner* — Ganiyu A Hanidu

(57) ABSTRACT

An electronic device includes a display, a vibration element positioned under the display, a microphone, and a processor electrically connected to the display, the vibration element, and the microphone. The processor is configured to allow the vibration element to vibrate the display such that the display outputs a first signal having a first waveform. The electronic device obtains a second signal having a second waveform through the microphone in response to the output of the first signal. In addition, the processor controls the display based on a result of comparing the first waveform and the second waveform.

15 Claims, 11 Drawing Sheets

(56) References Cited

U.S. PATENT DOCUMENTS

| | | | |
|---|---|---|---|
| 2015/0341714 A1* | 11/2015 | Ahn | G06F 1/1688 |
| | | | 381/333 |
| 2016/0007123 A1* | 1/2016 | Mizuta | H04M 1/03 |
| | | | 381/333 |
| 2017/0011210 A1* | 1/2017 | Cheong | A61B 5/0022 |

* cited by examiner

| AMPLITUDE OF FIRST WAVEFORM | AMPLITUDE OF SECOND WAVEFORM | RATE | DISTANCE |
|---|---|---|---|
| 10dB | 9.8dB | 98% | 1cm |
| 10dB | 8.5dB | 85% | 3cm |
| 10dB | 7.3dB | 73% | 5cm |
| 10dB | 6.0dB | 60% | 8cm |
| 10dB | 5.5dB | 55% | 12cm |
| 10dB | 4.8dB | 48% | 17cm |
| 10dB | 3.5dB | 35% | 23cm |

FIG.6

ELECTRONIC DEVICE AND METHOD FOR CONTROLLING DISPLAY USING PIEZOELECTRIC ELEMENT

CROSS-REFERENCE TO RELATED APPLICATION(S)

This application claims the benefit under 35 U.S.C. § 119(a) of a Korean patent application filed on Aug. 16, 2016, in the Korean Intellectual Property Office and assigned Serial number 10-2016-0103419, the entire disclosure of which is hereby incorporated by reference.

TECHNICAL FIELD

The present disclosure relates to a technology for generating ultrasonic waves by vibrating a display with a piezoelectric element.

BACKGROUND

An electronic device, which is equipped with a display, such as a smartphone, a wearable device, or the like has been widely supplied as mobile communication technologies develop. The electronic device may execute various functions such as a photo or video capturing function, a music or video file play function, a game function, an Internet function, and the like through the display, as well as a call function.

When any one of the above-described functions is executed, the electronic device may turn off the display such that the remaining functions are not executed. For example, the electronic device may use a proximity sensor and a receiver to prevent any other function(s) from being executed due to a contact between a user's face and the display while being on the phone. If phone sound is output through the receiver, the proximity sensor may calculate a distance between the electronic device and an object.

The proximity sensor may output ultrasonic waves or light; if the ultrasonic waves or light reflected from the object is received, the proximity sensor may calculate the distance between the electronic device and the object based on a time period from a time when the ultrasonic waves or light is output to a time when the reflected ultrasonic waves or light is received. If the calculated distance is not less than a specific distance or more, the electronic device may turn on the display. If the calculated distance is less than the specific distance, the electronic device may turn off the display. If the ON/OFF of the display is controlled according to the calculated distance, it may be possible to prevent any other function from being executed while being on the phone.

However, a bezel of a specific width or more may be necessary to dispose the proximity sensor and the receiver on a front surface of the electronic device. If the width of bezel increases, the size of the display may decrease, thereby reducing the immersion of the user. Also, if the width of bezel increases, a front configuration of the electronic device may be restricted in design.

Accordingly, there is a need for an electronic device capable of calculating a distance between the electronic device and an object without using the proximity sensor. Also, there is a need for an electronic device capable of outputting sound without using the receiver.

SUMMARY

To address the above-discussed deficiencies, it is a primary object to provide at least one of the advantages described below. Accordingly, various embodiments of the present disclosure are to provide an electronic device for solving the above-described one or more problems.

In accordance with an aspect of the present disclosure, an electronic device may include a display, a vibration element positioned under the display, a microphone, and a processor electrically connected to the display, the vibration element, and the microphone. The processor may be configured to allow the vibration element to vibrate the display such that the display outputs a first signal having a first waveform, to obtain a second signal having a second waveform through the microphone in response to the output of the first signal, and to control the display based on a result of comparing the first waveform and the second waveform.

In accordance with another aspect of the present disclosure, a method for controlling a display may include allowing a vibration element positioned under the display to vibrate the display such that the display outputs a first signal having a first waveform, obtaining a second signal having a second waveform through a microphone in response to the output of the first signal, and controlling the display based on a result of comparing the first waveform and the second waveform.

In accordance with another aspect of the present disclosure, a storage medium may store an computer-readable instruction that, when executed by an electronic device, causes the electronic device to allow a vibration element positioned under the display to vibrate the display such that the display outputs a first signal having a first waveform, to obtain a second signal having a second waveform through a microphone in response to the output of the first signal, and to control the display based on a result of comparing the first waveform and the second waveform.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a ratio of a second waveform to a first waveform and a distance corresponding to the ratio, according to an embodiment;

DETAILED DESCRIPTION

Figure 1:
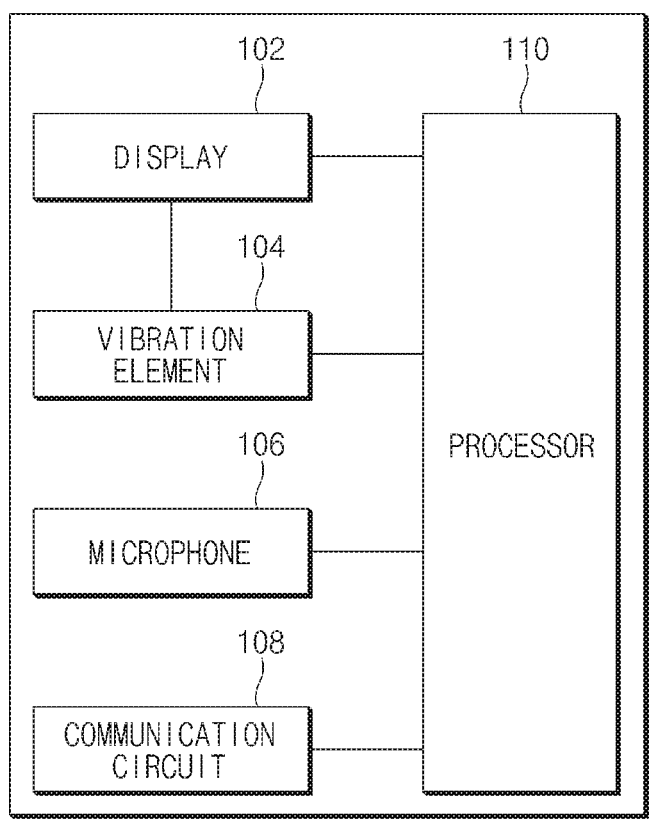
FIG. 1 illustrates a block diagram of an electronic device according to an embodiment.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as being customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a block diagram of an electronic device 100 according to an embodiment.

Referring to FIG. 1, the electronic device 100 according to an embodiment may include a display 102, a vibration element 104, a microphone 106, a communication circuit 108, and a processor 110.

The display 102 may output content (e.g., a text, an image, a video, an icon, a widget, a symbol, or the like) or may receive a touch input (including a touch, a hovering, and a "force touch") from a user. The force touch may refer to a sensing technology for recognizing the intensity of force, with which the user pushes a display, and operating differently according to the intensity of the recognized force.

The vibration element 104 may be attached on one surface (e.g., a rear surface) of the display 102 to vibrate the display 102. For example, if the processor 110 applies a voltage to the vibration element 104, the vibration element 104 may vibrate. For example, the vibration element 104 may be a piezoelectric element. The piezoelectric element may be an element that generates a voltage if physical pressure is applied to the piezoelectric element and is expanded or compressed if a voltage is applied to the piezoelectric element. The piezoelectric element may be implemented with crystal, piezoelectric ceramic, or the like.

The microphone 106 may receive ultrasonic waves or sound generated on the outside of the electronic device 100. If ultrasonic waves output from the display 102 is reflected and received from an object (e.g., a face of the user), the microphone 106 may provide the processor 110 with the reflected and received ultrasonic waves. For example, the microphone 106 may be disposed on a side surface of the electronic device 100 or on a front surface of the electronic device 100. If the microphone 106 is disposed on the side surface of the electronic device 100, the microphone 106 may not exist in the bezel. This may mean that the electronic device 100 has a relatively thin bezel. If the microphone 106 is disposed on the front surface of the electronic device 100, the microphone 106 may receive the ultrasonic waves reflected from the object (e.g., the user's face) much more than when the microphone 106 is disposed on the side surface of the electronic device 100. This may mean that the efficiency of receiving ultrasonic waves increases.

The communication circuit 108 may receive a call from an external terminal. The communication circuit 108 may transmit a call that the electronic device 100 generates. For example, the communication circuit 108 may include an antenna radiator for transmitting/receiving a signal of a predefined frequency. The communication circuit 108 may be disposed in a partial area of the bezel.

The processor 110 may be electrically connected with the display 102, the vibration element 104, the microphone 106, and the communication circuit 108. The processor 110 may apply a voltage to the vibration element 104 to vibrate the vibration element 104. If the vibration element 104 vibrates, the display 102 may also vibrate together. Accordingly, the processor 110 may vibrate the display 102 by allowing the vibration element 104 to vibrate. If the display 102 vibrates at a specific period, ultrasonic waves or sound may be output from the display 102.

If the ultrasonic waves output from the display 102 are reflected and returned from an object (e.g., a face of the user), the processor 110 may receive the reflected ultrasonic waves through the microphone 106. The processor 110 may obtain a distance between the electronic device 100 and the object based on the output ultrasonic waves and the received ultrasonic waves. If the distance between the electronic device 100 and the object is obtained, the processor 110 may control the display 102 based on the obtained distance. For example, the processor 110 may control the ON/OFF of the display 102 based on the obtained distance.

Figure 2:
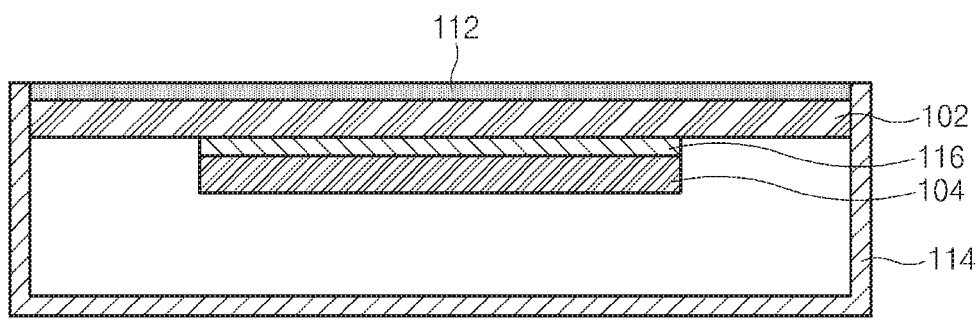
FIG. 2 illustrates a sectional view of the electronic device according to an embodiment.

FIG. 2 illustrates a sectional view of the electronic device 100 according to an embodiment.

Referring to FIG. 2, the electronic device 100 may further include a cover glass 112, a housing 114, and an adhesive film 116. In this specification, content described with reference to FIG. 1 may be identically applied to elements that have the same reference marks as those of the electronic device 100 described with reference to FIG. 1.

The cover glass 112 may transmit light generated by the display 102. Also, the user may touch a portion (e.g., a finger) of his/her body on the cover glass 112 to perform a touch (including a contact using an electronic pen). The cover glass 112 may be formed of, for example, tempered glass, reinforced plastic, a flexible polymer material, or the like and may protect the display 102 or each element included in the electronic device 100 from an external shock. According to various embodiments, the cover glass 112 may be also referred to as a "glass window".

The housing 114 may accommodate each element of the electronic device 100. The housing 114 may be also referred to as a "rear case", a "rear plate", or the like. The housing 114 may include an area that is not exposed to the outside of the electronic device 100 and an area that is exposed through an outer side surface of the electronic device 100. For example, the area that is not exposed to the outside of the electronic device 100 may be formed of a plastic injection-molding material, and the area that is exposed through the outer side surface of the electronic device 100 may be formed of a metal material. The exposed area of the outer side surface, which is formed of a metal material, may be also referred to as a "metal bezel". According to an embodiment, at least part of the metal bezel may be used as an antenna radiator for transmitting and receiving a signal of a predefined frequency.

The adhesive film 116 may be interposed between the vibration element 104 and the display 102. Vibration generated by the vibration element 104 may be transferred to the display 102 through the adhesive film 116. According to an embodiment, the adhesive film 116 may be an optically clear adhesive film.

Figure 3:
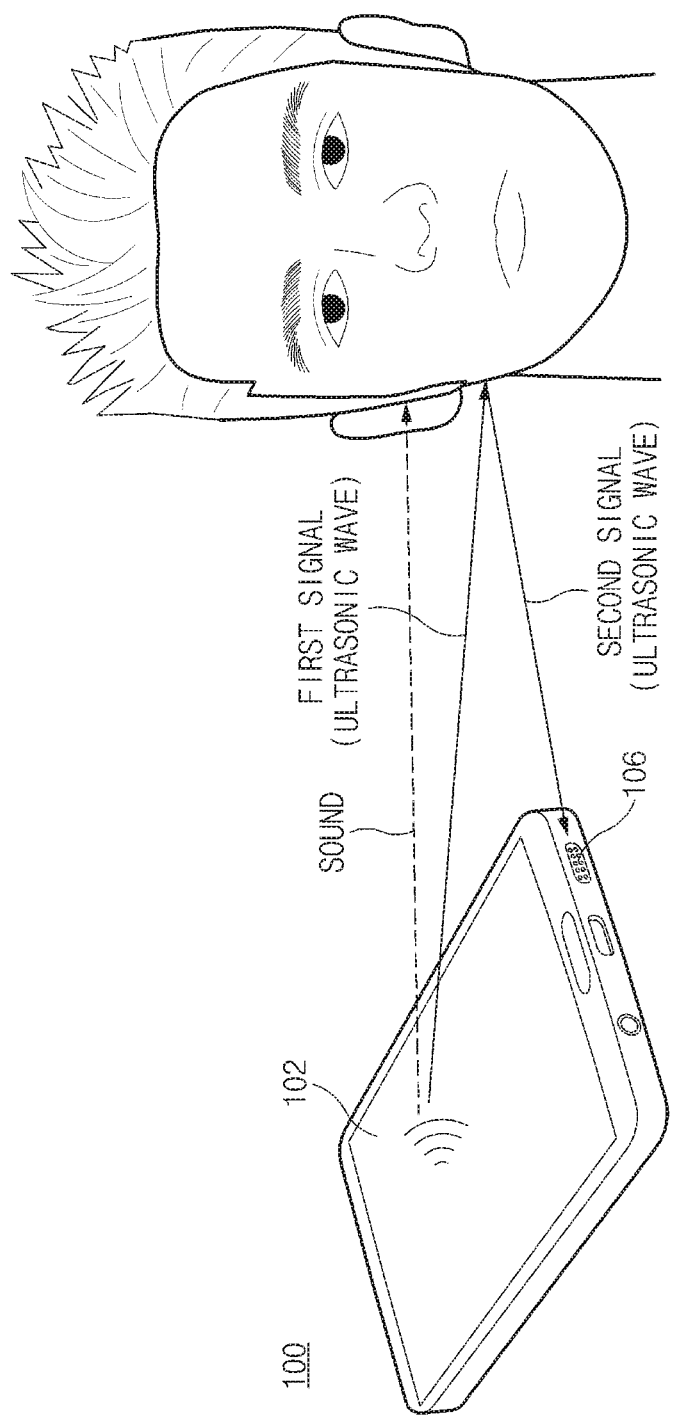
FIG. 3 illustrates how an ultrasonic wave is reflected by an object and how sound is output from a display, according to an embodiment.

FIG. 3 illustrates how an ultrasonic wave is reflected by an object and how sound is output from the display 102, according to an embodiment.

Referring to FIG. 3, the processor 110 may allow the vibration element 104 to vibrate the display 102 such that the display 102 outputs a first signal having a first waveform. If the first signal is output, the processor 110 may obtain a second signal having a second waveform through the microphone 106. The second signal may be a signal that corresponds to the first signal reflected and received from the object (e.g., a face of the user).

If the second signal is obtained, the processor 110 may be configured to control the display 102 based on a result of comparing the first waveform and the second waveform. For example, if it is determined that an approaching object is within a predefined distance, the processor 110 may be configured to turn off the display 102. In contrast, if it is determined that an object is outside of the predefined distance, the processor 110 may be configured to turn on the display 102. According to an embodiment, it may be possible to prevent any other function from being executed on the phone by controlling the ON/OFF of the display 102 depending on the distance between the electronic device 100 and the object.

For example, the first signal may be an ultrasonic wave. The ultrasonic wave output through the display 102 may be received through the microphone 106 after being reflected from the user's face. The output ultrasonic wave may be the same as or different from the reflected ultrasonic wave in amplitude, frequency, or the like.

Continuing to refer to FIG. 3, the processor 110 may allow the vibration element 104 to vibrate the display 102 such that the display 102 outputs sound. For example, the sound may be phone sound, music, bell, or the like. According to various embodiments, if the communication circuit 108 receives a call from an external terminal, the processor 110 may allow the display 102 to vibrate such that the display 102 outputs sound. The first signal and the sound may be output at the same time or at different timing under control of the processor 110.

Figure 4:
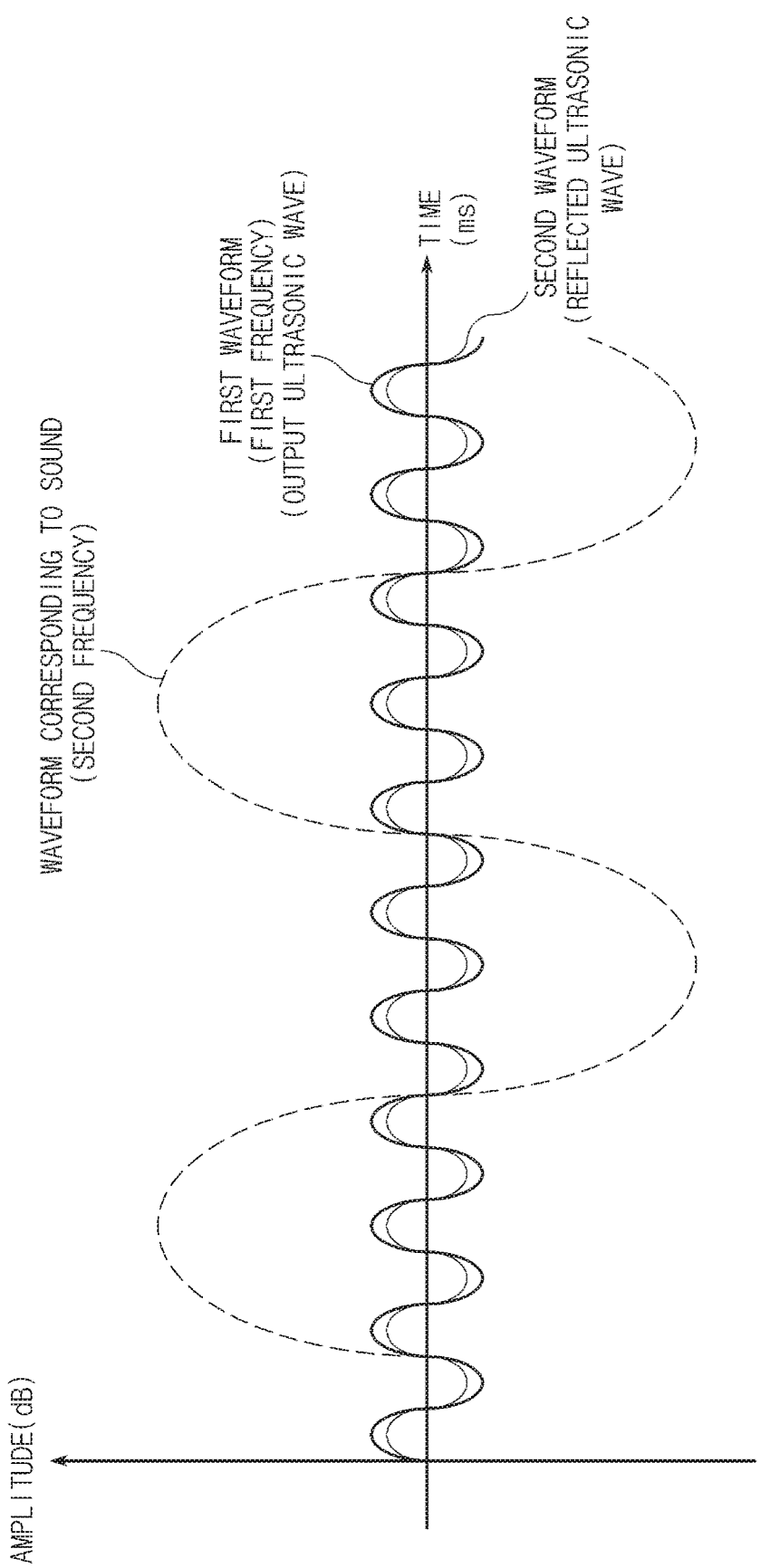
FIG. 4 illustrates a waveform corresponding to an ultrasonic wave and a waveform corresponding to sound, according to an embodiment.
Figure 5:
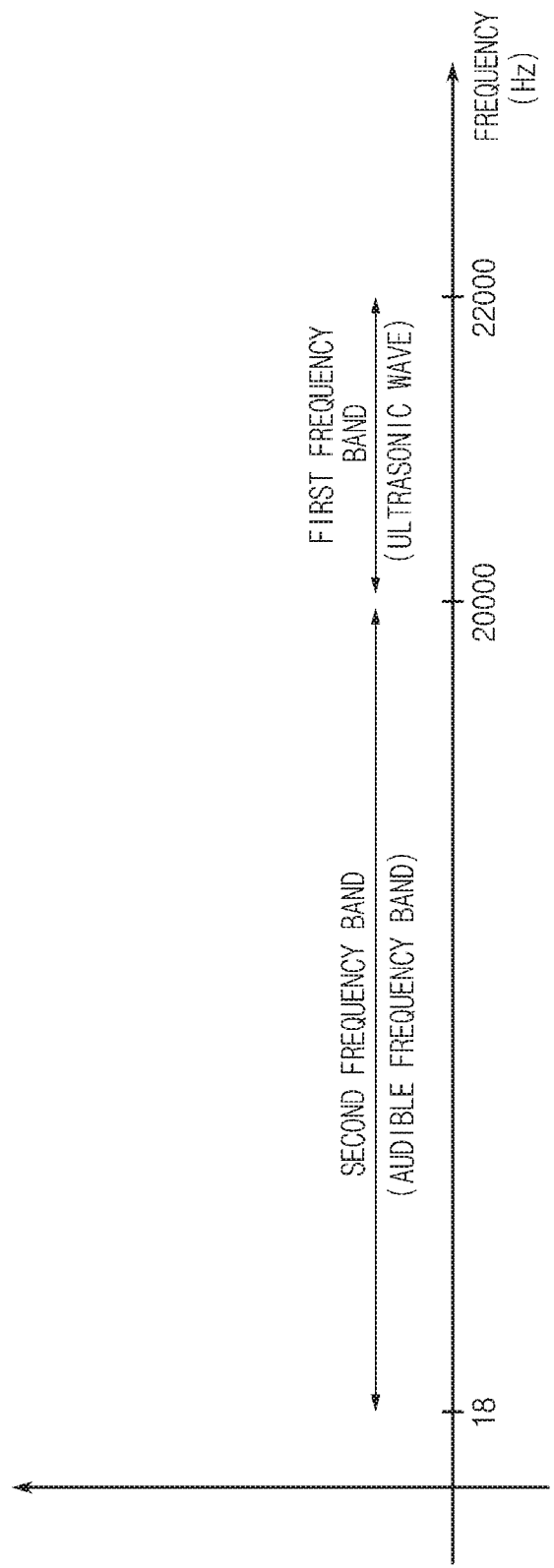
FIG. 5 illustrates a first frequency band and a second frequency band according to an embodiment.

FIG. 4 illustrates a waveform corresponding to an ultrasonic wave and a waveform corresponding to sound, according to an embodiment. FIG. 5 illustrates a first frequency band and a second frequency band according to an embodiment.

Referring to FIGS. 4 and 5, the processor 110 may allow the vibration element 104 to vibrate the display 102 at the first frequency band such that the display 102 outputs a first signal. For example, the first frequency band may be 20,000 Hz to 22,000 Hz, and the first signal may be an ultrasonic wave. Also, the processor 110 may allow the vibration element 104 to vibrate the display 102 at the second frequency band such that the display 102 outputs sound. For example, the second frequency band that is an audible frequency band may be 18 Hz to 20,000 Hz. According to one embodiment, the processor 110 may output an ultrasonic wave and/or sound by allowing the display 102 to vibrate at the first frequency band and/or the second frequency band.

For example, the minimum value of the first frequency band may be larger than the minimum value of the second frequency band. If the first frequency band and the second frequency band overlap each other, the first signal may be heard by ears of the user. The first signal may be a means for determining a distance between the electronic device 100 and an object, and information that the user needs may not be included in the first signal. Accordingly, there is a need to distinguish between the first frequency band and the second frequency band. The processor 110 may set the minimum value of the first frequency band to be larger than the maximum value of the second frequency band, and thus, the user may only hear sound.

For example, the processor 110 may allow the vibration element 104 to vibrate the display 102 at the second frequency band in response to receiving a call. If the display 102 vibrates at the second frequency band, sound (e.g., phone sound) may be output through the display 102. The electronic device 100 may immediately transmit information, which another user transmits, to the user of the electronic device 100 by vibrating the display 102 at the second frequency band in response to receiving the call.

For example, the processor 110 may allow the vibration element 104 to vibrate the display 102 at the first frequency band at a predefined frequency. If the display 102 vibrates at the first frequency band, an ultrasonic wave may be output through the display 102 for the predefined period. If the ultrasonic wave is output during the predefined period, whether an object is present may be determined during the predefined period. For example, the predefined period may be 0.1 second, and sensitivity may increase as the predefined period becomes shorter.

FIG. 6 illustrates a ratio of a second waveform to a first waveform and a distance corresponding to the ratio, according to an embodiment.

Referring to FIG. 6, the processor 110 may control the ON/OFF of the display 102 based on a ratio of an amplitude of the second waveform to an amplitude of the first waveform. A distance corresponding to the ratio may be stored in a memory, and the ratio may increase as a distance between the electronic device 100 and an object decreases. For example, if the amplitude of the first waveform is 10 dB and the amplitude of the second waveform is 9.8 dB, the processor 110 may determine that the ratio is 98% and a distance between the electronic device 100 and the object is 1 cm. Assuming that the predefined distance described with reference to FIG. 3 is 10 cm, since the distance between the electronic device 100 and the object is 1 cm, the processor 110 may turn off the display 102.

If the amplitude of the first waveform is 10 dB and the amplitude of the second waveform is 3.5 dB, the processor 110 may determine that the ratio is 35% and a distance between the electronic device 100 and the object is 23 cm. Assuming that the predefined distance described with reference to FIG. 3 is 10 cm, since the distance between the electronic device 100 and the object is 23 cm, the processor 110 may turn on the display 102.

According to an embodiment, the processor 110 may be configured to control the ON/OFF of the display 102 based on a ratio of the area of the second waveform to the area of the first waveform. The area of the first waveform may be an integral value of the first waveform illustrated in FIG. 4, and the area of the first waveform may be the same as the amount of an ultrasonic wave output from the display 102. The area of the second waveform may be an integral value of the second waveform illustrated in FIG. 4, and the area of the second waveform may be the same as the amount of a reflected ultrasonic wave. The amount of the reflected ultrasonic wave may increase as a distance between the electronic device 100 and the object decreases.

For example, the processor 110 may be configured to control the ON/OFF of the display 102 based on a ratio of a frequency of the second waveform to a frequency of the first waveform. For example, if the frequency of the first waveform may be 21,000 Hz, the frequency of the second waveform may be 20,900 Hz. The frequency of the second waveform may be higher or lower than the frequency of the first waveform. As a distance between the electronic device 100 and the object decreases, a rate at which the frequency of the first waveform and the frequency of the second waveform coincide with each other may increase.

Figure 7:
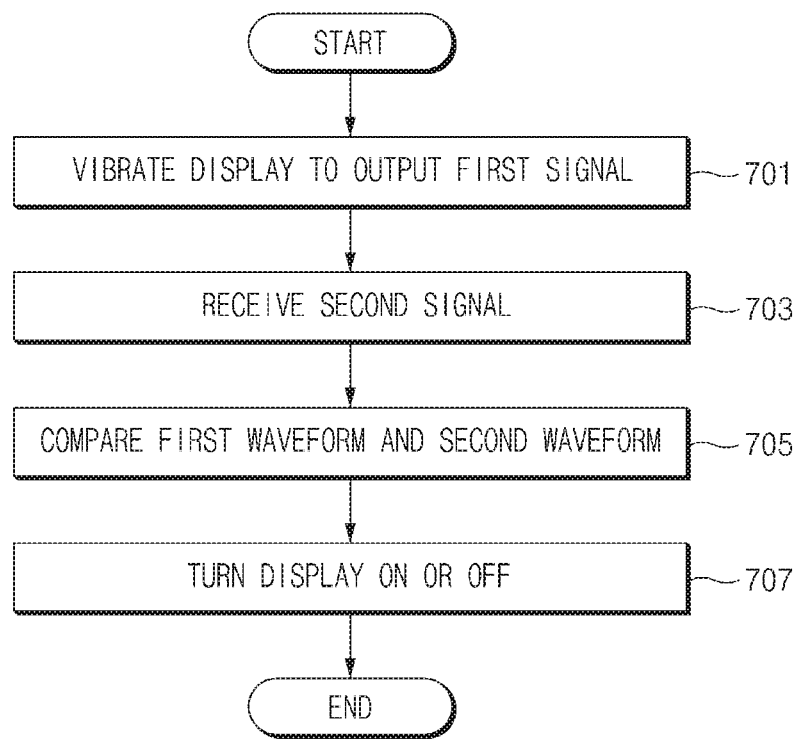
FIG. 7 illustrates an operation flowchart of the electronic device according to an embodiment.

FIG. 7 illustrates an operation flowchart of the electronic device 100 according to an embodiment.

Referring to FIG. 7, in operation 701, the processor 110 may allow the vibration element 104 to vibrate the display 102 such that the display 102 outputs a first signal having a first waveform. If the first signal is output, in operation 73, the processor 110 may obtain a second signal having a second waveform through the microphone 106. The first signal having the first waveform and the second signal having the second waveform may be substantially the same as the first signal and the second signal described with reference to FIGS. 3 and 4.

If the second signal is obtained, in operation 705, the processor 110 may compare the first waveform and the second waveform. For example, in operation 705, the processor 110 may compare the amplitudes and frequencies of the first waveform and the second waveform to obtain a distance between the electronic device 100 and the object. In operation 707, the processor 110 may control the display 102 based on the comparison result of the first waveform and the second waveform, which is obtained in operation 705. For example, the processor 110 may control the ON/OFF of the display 102 based on the comparison result of the first waveform and the second waveform obtained in operation 705.

Figure 8:
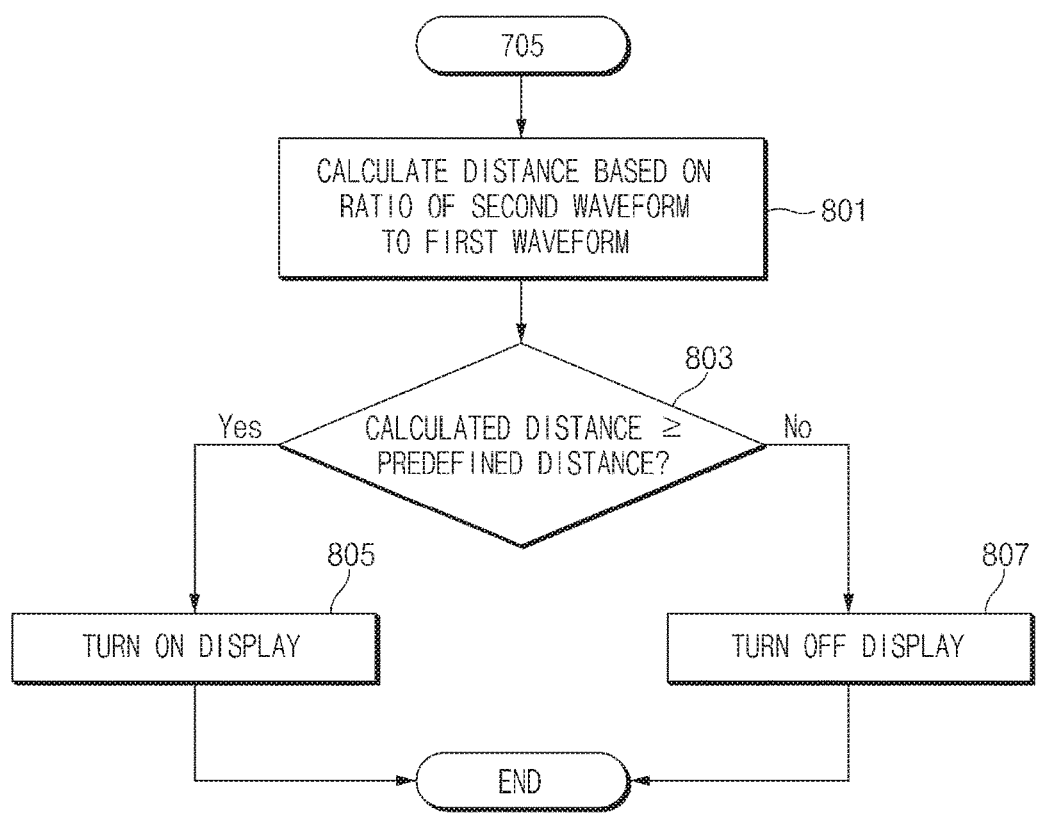
FIG. 8 illustrates a flowchart in which the display is controlled based on a distance between the electronic device and an object, according to an embodiment.

FIG. 8 illustrates a flowchart in which the display 102 is controlled based on a distance between the electronic device 100 and an object, according to an embodiment.

Referring to FIG. 8, in operation 801, the processor 110 may obtain a distance between the electronic device 110 and an object based on a ratio of a second waveform to a first waveform. For example, the processor 110 may obtain a distance between the electronic device 110 and the object based on a ratio of amplitude of the second waveform to amplitude of the first waveform. A method for obtaining the distance between the electronic device 100 and the object may be substantially the same as the method described with reference to FIG. 6.

If the distance between the electronic device 100 and the object is obtained, in operation 803, the processor 110 may compare the obtained distance and a predefined distance. The predefined distance may be stored in a memory or may be set by the user. If the comparison result indicates that the obtained distance is larger than the predefined distance, in operation 805, the processor 110 may be configured to turn on the display 102. If the comparison result indicates that the obtained distance is smaller than the predefined distance, in operation 807, the processor 110 may be configured to turn off the display 102.

Figure 9:
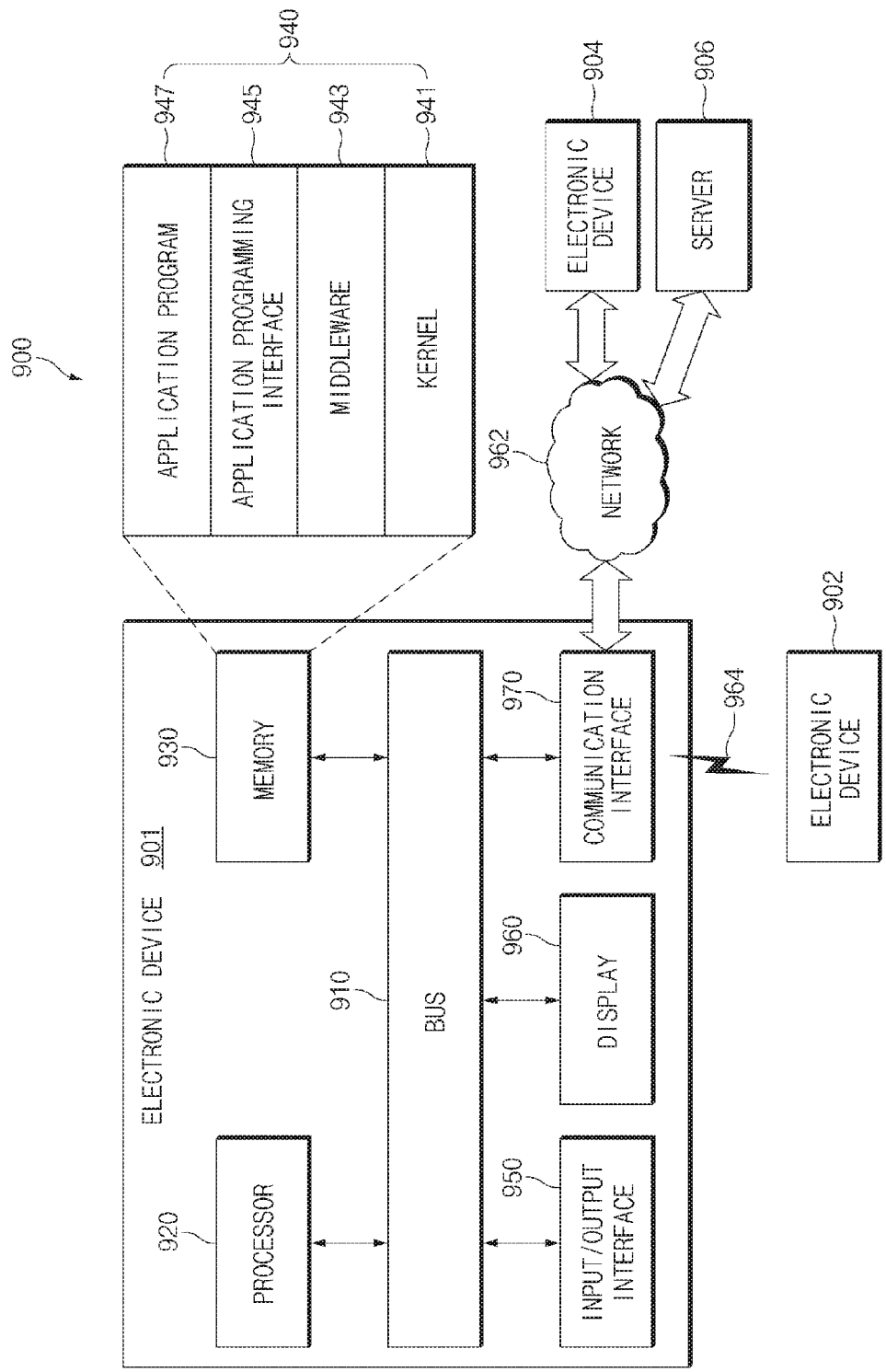
FIG. 9 illustrates the electronic device in a network environment, according to various embodiments.

FIG. 9 illustrates an electronic device in a network environment, according to an embodiment.

Referring to FIG. 9, according to various embodiments, an electronic device 901 in a network environment 900 is described. The electronic device 901 may include a bus 910, a processor 920, a memory 930, an input/output interface 950, a display 960, and a communication interface 970. According to an embodiment, the electronic device 901 may not include at least one of the above-described elements or may further include other element(s). The bus 910 may interconnect the above-described elements 910 to 970 and may include a circuit for conveying communications (e.g., a control message and/or data) among the above-described elements.

The processor 920 may include one or more of a central processing unit (CPU), an application processor (AP), or a communication processor (CP). For example, the processor 920 may perform an arithmetic operation or data processing associated with control and/or communication of at least other elements of the electronic device 901.

The memory 930 may include a volatile and/or nonvolatile memory. For example, the memory 930 may store instructions or data associated with at least one other element(s) of the electronic device 901. According to an embodiment, the memory 930 may store software and/or a program 940.

The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform, for example, a mediation role such that the API 945 or the application program 947 communicates with the kernel 941 to exchange data. Furthermore, the middleware 943 may process one or more task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947 and may process the one or more task requests.

The API 945 may be an interface through which the application program 947 controls a function provided by the kernel 941 or the middleware 943, and may include, for example, at least one interface or function (e.g., an instruction) for a file control, a window control, image processing, a character control, or the like.

The input/output interface 950 may transmit an instruction or data input from a user or another external device, to other element(s) of the electronic device 901 or may output an instruction or data, received from other element(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first external electronic device 902, the second external electronic device 904, or the server 906). For example, the communication interface 970 may be connected to the network 962 over wireless communication or wired communication to communicate with the external device (e.g., the second external electronic device 904 or the server 906).

The wireless communication may include cellular communication that uses at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. According to an embodiment, the wireless communication may include, for example, at least one of wireless fidelity (Wi-Fi), Bluetooth, Bluetooth low energy (BLE), Zigbee, near field communication (NFC), magnetic stripe transmission (MST), radio frequency, body area network (BAN). According to an embodiment, the wireless communication may include a global navigation satellite system (GNSS). The GNSS may be, for example, a global positioning system (GPS), a global navigation satellite system (Glonass), a Beidou navigation satellite system (hereinafter referred to as "Beidou"), or a European global satellite-based navigation system (hereinafter referred to as "Galileo"). Hereinafter, in this disclosure, "GPS" and "GNSS" may be interchangeably used.

The wired communication may include at least one of, for example, a universal serial bus (USB), a high definition multimedia interface (HDMI), a recommended standard-232 (RS-232), power-line communication, a plain old telephone service (POTS), or the like. The network 962 may include at least one of telecommunications networks, for example, a computer network (e.g., LAN or WAN), an Internet, or a telephone network.

Each of the first and second external electronic devices 902 and 904 may be a device of which the type is different from or the same as that of the electronic device 901. According to various embodiments, all or a portion of operations that the electronic device 901 will perform may be executed by another or plural electronic devices (e.g., the electronic device 902 or 904, or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 at another electronic device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
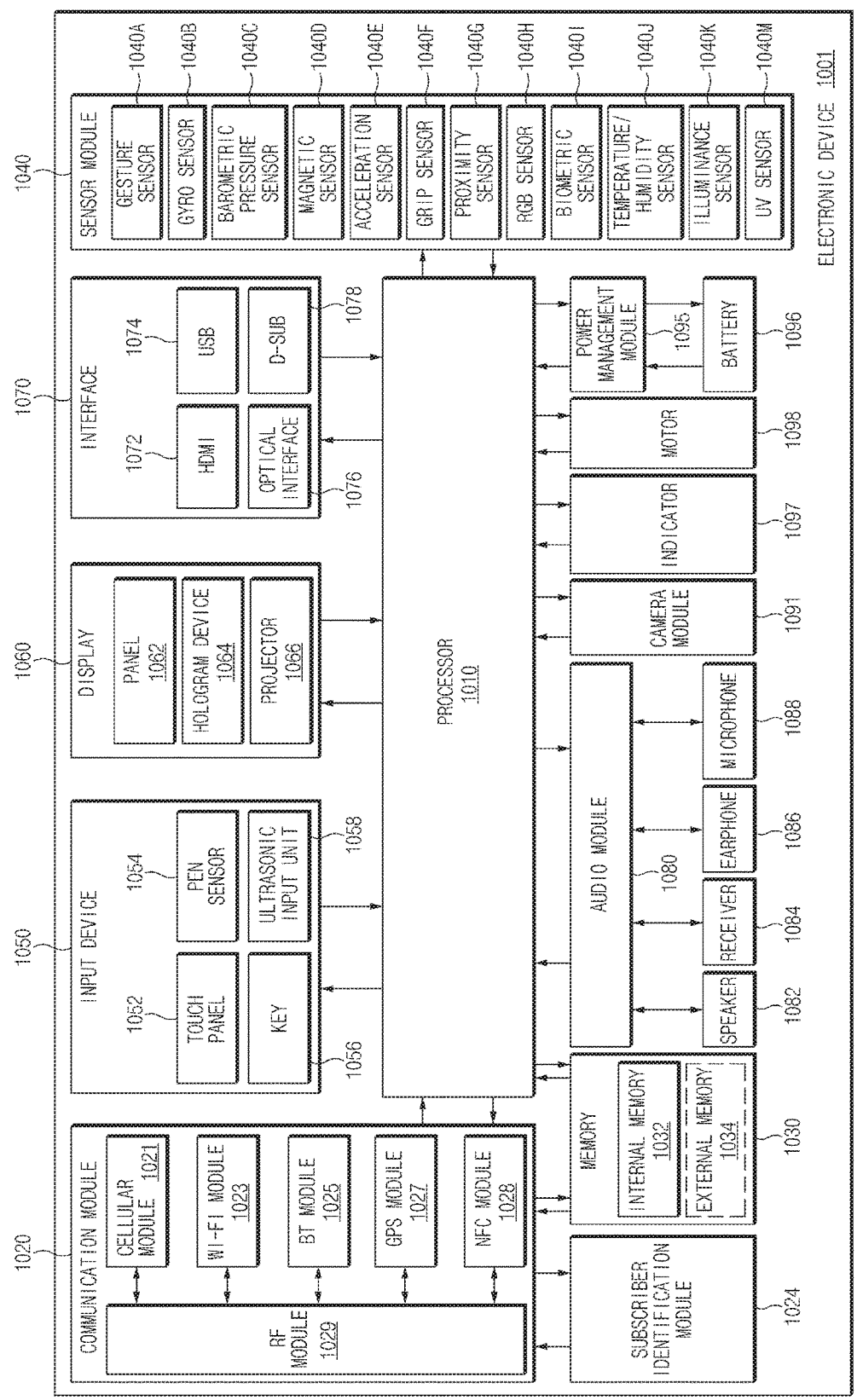
FIG. 10 illustrates a block diagram of an electronic device according to an embodiment.

FIG. 10 illustrates a block diagram of an electronic device, according to an embodiment.

An electronic device 1001 may include, for example, all or a part of the electronic device 901 illustrated in FIG. 9. The electronic device 1001 may include one or more processors (e.g., an application processor (AP)) 1010, a communication module 1020, a subscriber identification module 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an operating system (OS) or an application to control a plurality of hardware or software elements connected to the processor 1010 and may process and compute a variety of data. For example, the processor 1010 may be implemented with a System on Chip (SoC). According to an embodiment, the processor 1010 may further include a graphic processing unit (GPU) and/or an image signal processor. The processor 1010 may include at least a part (e.g., a cellular module 1021) of elements illustrated in FIG. 10. The processor 1010 may load an instruction or data, which is received from at least one of other elements (e.g., a nonvolatile memory), into a volatile memory and process the loaded instruction or data. The processor 1010 may store result data in the nonvolatile memory.

The communication module 1020 may be configured the same as or similar to the communication interface 970. The communication module 1020 may include the cellular module 1021, a Wi-Fi module 1023, a Bluetooth (BT) module 1025, a GNSS module 1027, a near field communication (NFC) module 1028, and a radio frequency (RF) module 1029.

The cellular module 1021 may provide, for example, voice communication, video communication, a character service, an Internet service, or the like over a communication network. According to an embodiment, the cellular module 1021 may perform discrimination and authentication of the electronic device 1001 within a communication network by using the subscriber identification module (e.g., a SIM card) 1024. According to an embodiment, the cellular module 1021 may perform at least a portion of functions that the processor 1010 provides. According to an embodiment, the cellular module 1021 may include a communication processor (CP). According to an embodiment, at least a part (e.g., two or more) of the cellular module 1021, the Wi-Fi module 1023, the BT module 1025, the GNSS module 1027, or the NFC module 1028 may be included within one Integrated Circuit (IC) or an IC package. For example, the RF module 1029 may transmit and receive a communication signal (e.g., an RF signal). For example, the RF module 1029 may include a transceiver, a power amplifier module (PAM), a frequency filter, a low noise amplifier (LNA), an antenna, or the like. According to another embodiment, at least one of the cellular module 1021, the Wi-Fi module 1023, the BT module 1025, the GNSS module 1027, or the NFC module 1028 may transmit and receive an RF signal through a separate RF module. The subscriber identification module 1024 may include, for example, a card and/or embedded SIM that includes a subscriber identification module and may include unique identifying information (e.g., integrated circuit card identifier (ICCID)) or subscriber information (e.g., international mobile subscriber identity (IMSI)).

The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD). The external memory 1034 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1034 may be operatively or physically connected to the electronic device 1001 through various interfaces.

The sensor module 1040 may measure, for example, a physical quantity or may detect an operation state of the electronic device 1001. The sensor module 1040 may convert the measured or detected information to an electric signal. For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Although not illustrated, additionally or generally, the sensor module 1040 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user. The (digital) pen sensor 1054 may be, for example, a part of a touch panel or may include an additional sheet for recognition. The key 1056 may include, for example, a physical button, an optical key, or a keypad. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 960) may include a panel 1062, a hologram device 1064, a projector 1066, and/or a control circuit for controlling the panel 1062, the hologram device 1064, or the projector 1066. The panel 1062 may be the same as or similar to the display 960 illustrated in FIG. 9. The panel 1062 may be implemented, for example, to be flexible, transparent or wearable. The panel 1062 and the touch panel 1052 may be implemented with one or mode modules. According to an embodiment, the panel 1062 may include a pressure sensor (or a force sensor) that is capable of measuring the intensity of pressure for a touch of a user. The pressure sensor and the touch panel 1052 may be integrated as an integral or may be implemented with separate one or more sensors independent of the touch panel 1052.

The hologram device 1064 may display a stereoscopic image in a space using a light interference phenomenon. The projector 1066 may project light onto a screen so as to display an image. For example, the screen may be arranged in the inside or the outside of the electronic device 1001. The interface 1070 may include, for example, a high-definition multimedia interface (HDMI) 1072, a universal serial bus (USB) 1074, an optical interface 1076, or a D-subminiature (D-sub) 1078. The interface 1070 may be included, for example, in the communication interface 970 illustrated in FIG. 9. Additionally or generally, the interface 1070 may include, for example, a mobile high definition link (MHL) interface, a SD card/multi-media card (MMC) interface, or an infrared data association (IrDA) standard interface.

The audio module 1080 may convert a sound and an electric signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088. For example, the camera module 1091 may shoot a still image or a video. According to an embodiment, the camera module 1091 may include at least one or more image sensors (e.g., a front sensor or a rear sensor), a lens, an image signal processor (ISP), or a flash (e.g., an LED, a xenon lamp, or the like). The power management module 1095 may manage, for example, power of the electronic device 1001. According to an embodiment, a power management integrated circuit (PMIC), a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects: vibration, haptic, and the like. A processing device (e.g., a GPU) for supporting a mobile TV may be included in the electronic device 1001. The processing device for supporting the mobile TV may process media data according to the standards of digital multimedia broadcasting (DMB), digital video broadcasting (DVB), Media-FLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 1001) may be omitted or other additional elements may be added. Furthermore, some of the elements of the electronic device may be combined with each other so as to form one entity, so that the functions of the elements may be performed in the same manner as before the combination.

Figure 11:
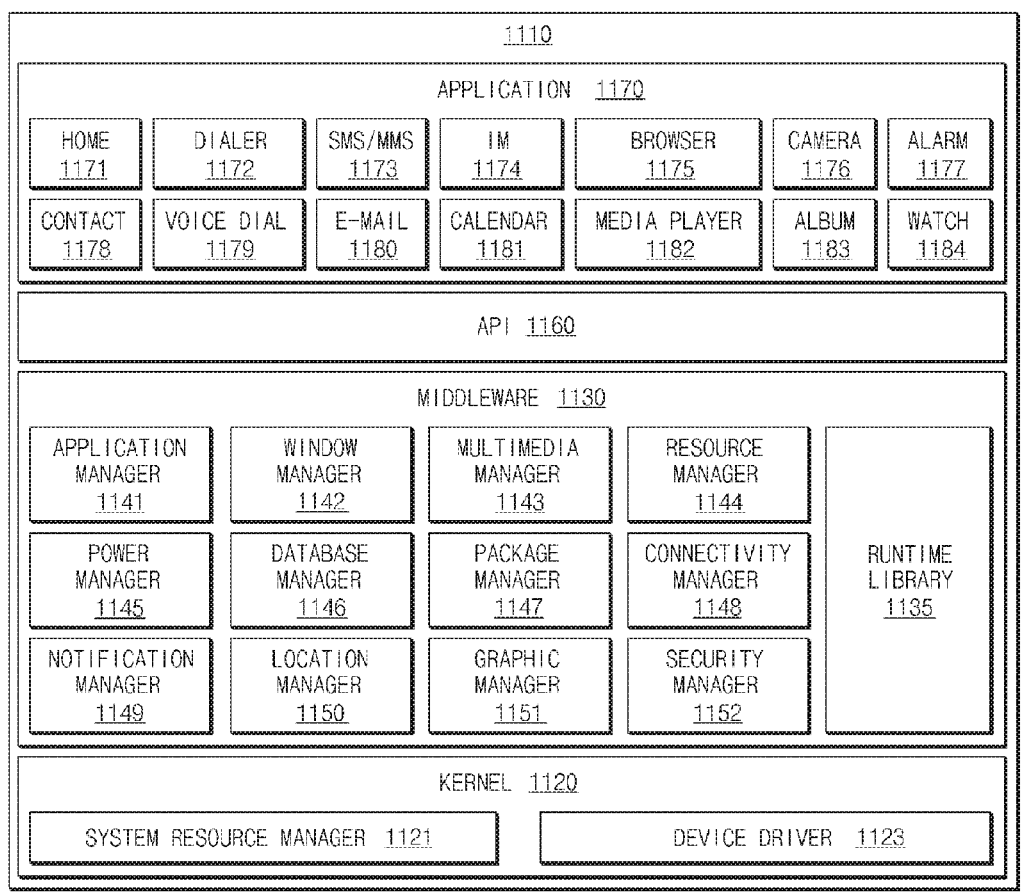
FIG. 11 illustrates a block diagram of a program module according to an embodiment.

FIG. 11 illustrates a block diagram of a program module, according to an embodiment.

According to an embodiment, a program module 1110 (e.g., the program 940) may include an operating system (OS) to control resources associated with an electronic device (e.g., the electronic device 901), and/or diverse applications (e.g., the application program 947) driven on the OS. The OS may be, for example, Android™, iOS™, Windows™, Symbian™, Tizen™, or Bada™.

Referring to FIG. 11, the program module 1110 may include a kernel 1120 (e.g., the kernel 941), a middleware 1130 (e.g., the middleware 943), an application programming interface (API) 1160 (e.g., the API 945), and/or an application 1170 (e.g., the application program 947). At least a portion of the program module 1110 may be preloaded on an electronic device or may be downloadable from an external electronic device (e.g., the electronic device 902 or 904, the server 906, or the like).

The kernel 1120 may include, for example, a system resource manager 1121 or a device driver 1123. The system resource manager 1121 may control, allocate, or retrieve system resources. According to an embodiment, the system resource manager 1121 may include a process managing unit, a memory managing unit, or a file system managing unit. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to use limited system resources of the electronic device. According to an embodiment, the middleware 1130 may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, or a security manager 1152.

The runtime library 1135 may include, for example, a library module that is used by a compiler to add a new function through a programming language while the application 1170 is being executed. The runtime library 1135 may perform input/output management, memory management, or capacities about arithmetic functions. The application manager 1141 may manage, for example, a life cycle of the application 1170. The window manager 1142 may manage a graphic user interface (GUI) resource that is used in a screen. The multimedia manager 1143 may identify a format necessary for playing media files, and may perform encoding or decoding of media files by using a codec suitable for the format.

The resource manager 1144 may manage source code of the application 1170 or a storage space. The power manager 1145 may manage a battery capacity or power, and may provide power information for an operation of an electronic device. According to an embodiment, the power manager 1145 may operate with a basic input/output system (BIOS). For example, the database manager 1146 may generate, search for, or modify the database that is to be used in the application 1170. The package manager 1147 may install or update an application that is distributed in the form of a package file.

The connectivity manager 1148 may manage, for example, wireless connection. The notification manager 1149 may provide, for example, an event such as arrival message, appointment, or proximity notification to a user. The location manager 1150 may manage, for example, location information about an electronic device. The graphic manager 1151 may manage, for example, a graphic effect that is provided to a user, or manage a user interface relevant thereto. The security manager 1152 may provide, for example, system security or user authentication.

According to an embodiment, the middleware 1130 may include a telephony manager for managing a voice or video call function of the electronic device and a middleware module that combines functions of the above-described elements. The middleware 1130 may provide a module specialized to each OS kind. The middleware 1130 may dynamically remove a part of the preexisting elements or may add new elements thereto. The API 1160 (e.g., the API 945) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1170 may include, for example, applications such as a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a watch 1184, health care (e.g., measuring an exercise quantity, blood sugar, or the like) or offering of environment information (e.g., information of barometric pressure, humidity, or temperature). According to an embodiment, the application 1170 may include an information exchanging application to support information exchange between an electronic device and an external electronic device.

The information exchanging application may include, for example, a notification relay application for transmitting specific information to an external electronic device, or a device management application for managing the external electronic device. For example, the notification relay application may transmit notification information, which arises from other applications of the electronic device, to an external electronic device or may receive notification information from an external electronic device and provide the notification information to a user. The device management application may install, delete, or update, for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 1170 may include an application (e.g., a health care application of a mobile medical device) that is assigned in accordance with an attribute of an external electronic device. According to an embodiment, the application 1170 may include an application that is received from an external electronic device. According to various embodiments, at least a portion of the program module 1110 may be implemented by software, firmware, hardware, or a combination of two or more thereof. At least a portion of the program module 1110 may include, for example, modules, programs, routines, sets of instructions, or processes for performing one or more functions.

The term "module" used in this disclosure may include a unit composed of hardware, software or firmware. For example, the term "module" may be interchangeably used with the terms "logic", "logical block", "component" and "circuit". The "module" may be an integrated component or may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 930) in the form of a program module. The instruction, when executed by a processor (e.g., the processor 920), may cause the processor to perform a function corresponding to the instruction.

According to an embodiment, a storage medium may store an computer-readable instruction that, when executed by an electronic device, causes the electronic device to allow a vibration element positioned under the display to vibrate the display such that the display outputs a first signal having a first waveform, to obtain a second signal having a second waveform through a microphone in response to the output of the first signal, and to control the display based on a result of comparing the first waveform and the second waveform.

A computer-readable recording medium may include a hard disk, a floppy disk, a magnetic media (e.g., a magnetic tape), an optical media (e.g., a compact disc read-only memory (CD-ROM) and a digital versatile disc (DVD), a magneto-optical media (e.g., a floptical disk)), and an internal memory. Also, a program instruction may include not only a mechanical code such as things generated by a compiler but also code executable on a computer using an interpreter. A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in this specification, a width of a bezel may decrease by obtaining a distance between an electronic device and an object by using ultrasonic waves generated in a display.

Besides, a variety of effects directly or indirectly understood through this disclosure may be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display;
a vibration element positioned under the display;
a microphone; and
a processor electrically connected to the display, the vibration element, and the microphone,
wherein the processor is configured to:
allow the vibration element to vibrate the display such that the display outputs a first signal having a first waveform;
obtain a second signal having a second waveform through the microphone in response to the output first signal;
turn off the display based on a result obtained by comparing the first waveform and the second waveform which indicates that an approaching object is within a predefined distance;
allow the vibration element to vibrate the display at a first frequency band such that the display outputs the first signal; and
allow the vibration element to vibrate the display at a second frequency band such that the display outputs sound,
wherein the first signal is an ultrasonic wave,
wherein the second signal is a signal that corresponds to the first signal reflected and received from an object, and
wherein a minimum value of the first frequency band is larger than a maximum value of the second frequency band.

2. The electronic device of claim 1, further comprising:
a communication circuit configured to receive a call from an external terminal,
wherein the processor is configured to:
allow the vibration element to vibrate the display at the second frequency band in response to receiving the call.

3. The electronic device of claim 1, wherein the processor is configured to:
allow the vibration element to vibrate the display at the first frequency band for a predefined period.

4. The electronic device of claim 1, wherein the processor applies a voltage to the vibration element to vibrate the vibration element.

5. The electronic device of claim 1, wherein the processor is configured to:
control an ON/OFF of the display based on a ratio of an area of the second waveform to an area of the first waveform.

6. The electronic device of claim 1, wherein the processor is configured to:
control an ON/OFF of the display based on a ratio of an amplitude of the second waveform to an amplitude of the first waveform.

7. The electronic device of claim 1, wherein the processor is configured to:
control an ON/OFF of the display based on a ratio of a frequency of the second waveform to a frequency of the first waveform, wherein the frequency of the first waveform is in the first frequency band.

8. The electronic device of claim 1, further comprising:
an adhesive film interposed between the vibration element and the display.

9. A method for controlling a display, the method comprising:
allowing a vibration element positioned under the display to vibrate the display such that the display outputs a first signal having a first waveform;
obtaining a second signal having a second waveform through a microphone in response to the output first signal;
turning off the display based on a result obtained by comparing the first waveform and the second waveform which indicates that an approaching object is within a predefined distance;

allowing the vibration element to vibrate the display at a first frequency band such that the display outputs the first signal; and allowing the vibration element to vibrate the display at a second frequency band such that the display outputs sound, wherein the first signal is an ultrasonic wave, wherein the second signal is a signal that corresponds to the first signal reflected and received from an object, and wherein a minimum value of the first frequency band is larger than a maximum value of the second frequency band.

10. The method of claim 9, further comprising:
receiving a call from an external terminal,
wherein the allowing of the vibration element to vibrate the display at the second frequency band such that the display outputs sound includes:
allowing the vibration element to vibrate the display at the second frequency band in response to receiving the call.

11. The method of claim 9, wherein the allowing of the vibration element to vibrate the display at the first frequency band such that the display outputs the first signal includes:
allowing the vibration element to vibrate the display at the first frequency band for a predefined period.

12. The method of claim 9, further comprising:
applying a voltage to the vibration element to vibrate the vibration element.

13. The method of claim 9, wherein the controlling includes:
controlling an ON/OFF of the display based on a ratio of an amplitude of the second waveform to an amplitude of the first waveform.

14. The method of claim 9, wherein the controlling includes:
controlling an ON/OFF of the display based on a ratio of a frequency of the second waveform to a frequency of the first waveform, wherein the frequency of the first waveform is in the first frequency band.

15. A storage medium storing computer-readable instructions that, when executed by an electronic device, cause the electronic device to:
allow a vibration element positioned under a display to vibrate the display such that the display outputs a first signal having a first waveform;
obtain a second signal having a second waveform through a microphone in response to the output first signal;
turn off the display based on a result obtained by comparing the first waveform and the second waveform which indicates that an approaching object is within a predefined distance;
allow the vibration element to vibrate the display at a first frequency band such that the display outputs the first signal; and
allow the vibration element to vibrate the display at a second frequency band such that the display outputs sound,
wherein the first signal is an ultrasonic wave,
wherein the second signal is a signal that corresponds to the first signal reflected and received from an object, and
wherein a minimum value of the first frequency band is larger than a maximum value of the second frequency band.

* * * * *